(12) United States Patent
Grigsby et al.

(10) Patent No.: US 8,139,743 B2
(45) Date of Patent: Mar. 20, 2012

(54) METHOD FOR PROVIDING ENHANCED AUDIO CONFERENCING SERVICES IN A TELEPHONY SYSTEM

(75) Inventors: Travis M. Grigsby, Austin, TX (US); Frank L. Jania, Chapel Hill, NC (US); Jeremy B. Sussman, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 12/142,047

(22) Filed: Jun. 19, 2008

(65) Prior Publication Data

US 2009/0316871 A1 Dec. 24, 2009

(51) Int. Cl.
*H04M 3/42* (2006.01)
(52) U.S. Cl. ............... 379/202.01; 370/260; 709/204
(58) Field of Classification Search ............. 379/202.01; 370/260; 709/204
See application file for complete search history.

(56) References Cited

U.S. PATENT DOCUMENTS

| 2007/0223668 A1* | 9/2007 | Blumenfeld et al. ..... 379/201.01 |
| 2009/0046838 A1* | 2/2009 | Andreasson ............. 379/101.01 |
| 2009/0313551 A1* | 12/2009 | Gibbon et al. ................ 715/745 |

* cited by examiner

*Primary Examiner* — Creighton Smith
(74) *Attorney, Agent, or Firm* — Cantor Colburn LLP; Ayla Lari (57) ABSTRACT

A method is provided for enhanced audio conferencing services. A request is received and authenticated for enhanced audio conferencing services. A calendar for the user is accessed, and scheduled conference calls of the user are determined from the calendar. A list of audio content for the user is accessed and provided to the user, such that a selected audio content from the list can be played in accordance with the scheduled conference calls. The user has options to play the audio content in between conference calls, louder than the conference calls, softer than the conference calls, and in one speaker while the conference calls play in another speaker. The scheduled conference call is called into so that it plays, and the selected audio content is played in accordance with the selected option. A trigger can stop the audio content and play the scheduled conference call in its place.

1 Claim, 5 Drawing Sheets

METHOD FOR PROVIDING ENHANCED AUDIO CONFERENCING SERVICES IN A TELEPHONY SYSTEM

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates to communications and particularly to communications which provide variable options for audible content.

2. Description of Background

As more and more content is being produced in audible form, our ability to consume the various audio content becomes disrupted by the cost of entry incurred in switching devices. In particular, for users who spend a great deal of time on the telephone, the cost of donning the device, starting and then stopping the media, removing the device, etc., between telephone calls can present significant barrier to consumption.

Since time is limited, multitasking has become a norm for some people. What is needed is a system and method for delivering audible content in a way that users who are frequently on the telephone can benefit and which can allow the user to benefit from multitasking if desired.

SUMMARY OF EXEMPLARY EMBODIMENTS

In accordance with exemplary embodiments, a method is provided for enhanced audio conferencing services. A request is received from a user for enhanced audio conferencing services. The request to receive enhanced audio conferencing services is authenticated. A calendar for the user is accessed, where scheduled conference calls of the user are determined from the calendar. A list of audio content for the user is accessed. The user is provided with the list of audio content, such that a selected audio content from the list of audio content can be played in accordance with the scheduled conference calls. The user is provided with options to select for playing the selected audio content. The options for playing the selected audio content may include: playing the selected audio content in between scheduled conference calls, playing the selected audio content louder than the scheduled conference calls, playing the selected audio content softer than the scheduled conference calls, and playing the selected audio content in one audio speaker while the scheduled conference calls play in another audio speaker. One of the scheduled conference calls is called into for the user, so that the one of the scheduled conference calls plays. The selected audio content is played in accordance with the selected option. If a trigger is received when the selected audio content is playing, the selected audio content is stopped and the one of the scheduled conference calls is played in place of the selected audio content. If the selected audio content is stopped, the selected audio content can resume playing from a point in which the selected audio content stopped.

System and computer program products corresponding to the above-summarized methods are also described herein.

Additional features and advantages are realized through the techniques of the present invention. Exemplary embodiments of the invention are described in detail herein and are considered a part of the claimed invention. For a better understanding of features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages are apparent from the following detailed description taken in conjunction with the accompanying drawings in which:

The detailed description explains exemplary embodiments, together with advantages and features, by way of example with reference to the drawings.

DETAILED DESCRIPTION OF EXEMPLARY EMBODIMENTS

Exemplary embodiments provide a system and method for queuing, controlling, and playing audible media in a telephony environment.

Figure 1:
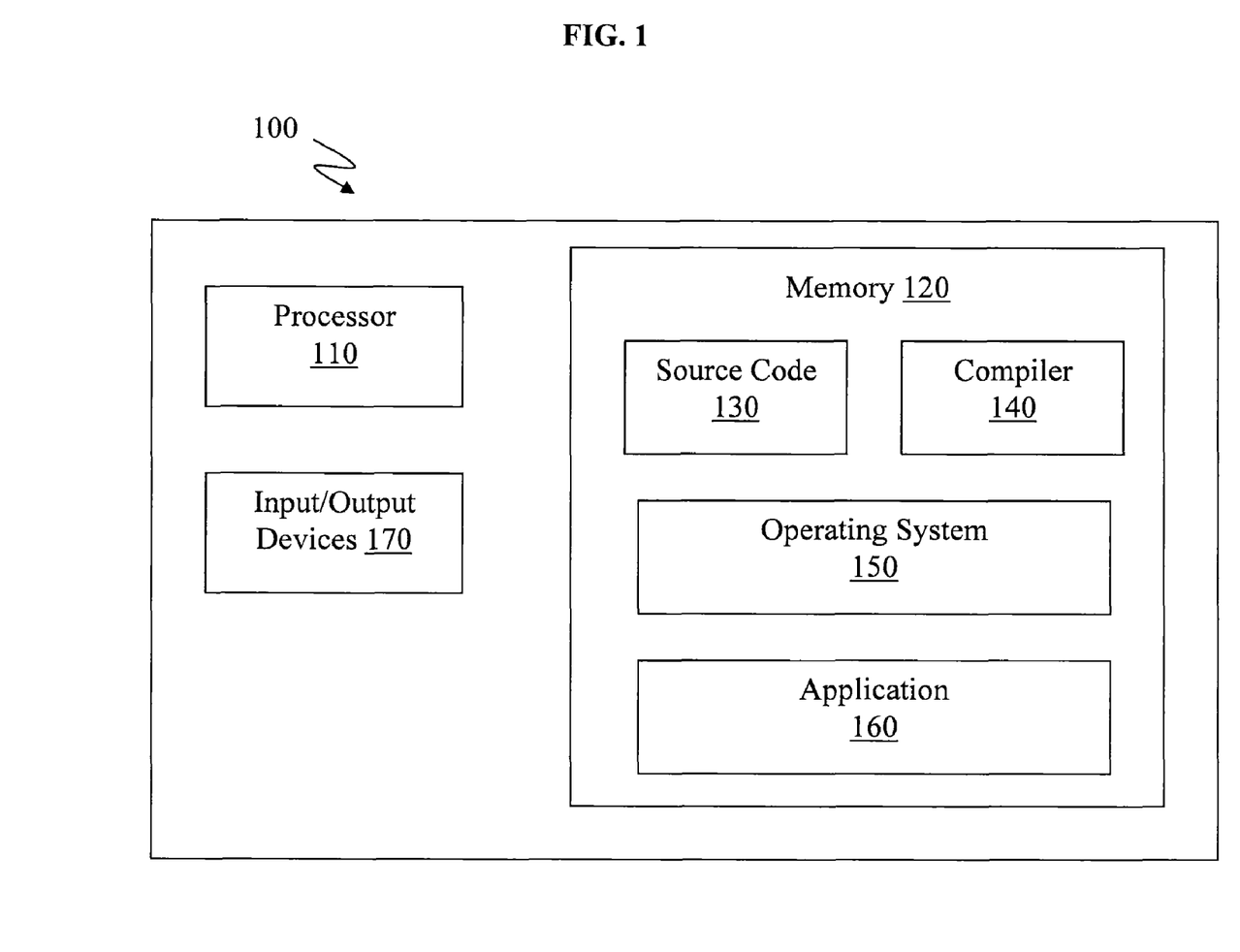
FIG. 1 illustrates an example of a computing device having capabilities, which may be utilized by exemplary embodiments.

FIG. 1 illustrates an example of a computing device 100 having capabilities, which may be utilized by exemplary embodiments. Various operations discussed herein may also utilize the capabilities of the computing device 100. One or more of the capabilities of the computing device 100 may be incorporated in any element, module, application, and/or component discussed herein.

The computing device 100 includes, but is not limited to, PCs, workstations, laptops, PDAs, palm devices, servers, storages, communication devices, and the like. Generally, in terms of hardware architecture, the computing device 100 may include one or more processors 110, memory 120, and one or more input and/or output (I/O) devices 170 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 110 is a hardware device for executing software that can be stored in the memory 120. The processor 110 can be virtually any custom made or commercially available processor, a central processing unit (CPU), a data signal processor (DSP), or an auxiliary processor among several processors associated with the computing device 100, and the processor 110 may be a semiconductor based microprocessor (in the form of a microchip) or a macroprocessor.

The memory 120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 may incorporate electronic, magnetic, optical, and/or other types of storage media. Note that the memory 120 can have a distributed architecture, where various components are situated remote from one another, but can be accessed by the processor 110.

The software in the memory 120 may include one or more separate programs, each of which comprises an ordered listing of executable instructions for implementing logical functions. The software in the memory 120 includes a suitable operating system (O/S) 150, compiler 140, source code 130, and application 160 in accordance with exemplary embodiments. As illustrated, the application 160 comprises numerous functional components for implementing the features and operations of the exemplary embodiments. The application 160 of the computing device 100 may represent various applications, computational units, logic, functional units, processes, operations, virtual entities, and/or modules in accordance with exemplary embodiments, but the application 160 is not meant to be a limitation.

The operating system 150 controls the execution of other computer programs, and provides scheduling, input-output control, file and data management, memory management, and communication control and related services. It is contemplated by the inventors that the application 160 for implementing exemplary embodiments may be applicable on all commercially available operating systems.

The application 160 may be a source program, executable program (object code), script, or any other entity comprising a set of instructions to be performed. When a source program, then the program is usually translated via a compiler (such as the compiler 140), assembler, interpreter, or the like, which may or may not be included within the memory 120, so as to operate properly in connection with the O/S 150. Furthermore, the application 160 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 170 may include input devices such as, for example but not limited to, a mouse, keyboard, scanner, microphone, camera, etc. Furthermore, the I/O devices 170 may also include output devices, for example but not limited to a printer, display, etc. Finally, the I/O devices 170 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 170 also include components for communicating over various networks, such as the Internet or intranet.

If the computing device 100 is a PC, workstation, intelligent device or the like, the software in the memory 120 may further include a basic input output system (BIOS) (omitted for simplicity). The BIOS is a set of essential software routines that initialize and test hardware at startup, start the O/S 150, and support the transfer of data among the hardware devices. The BIOS is stored in some type of read-only-memory, such as ROM, PROM, EPROM, EEPROM or the like, so that the BIOS can be executed when the computing device 100 is activated.

When the computing device 100 is in operation, the processor 110 is configured to execute software stored within the memory 120, to communicate data to and from the memory 120, and to generally control operations of the computing device 100 pursuant to the software. The application 160 and the O/S 150 are read, in whole or in part, by the processor 110, perhaps buffered within the processor 110, and then executed.

When the application 160 is implemented in software it should be noted that the application 160 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 160 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 160 is implemented in hardware, the application 160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
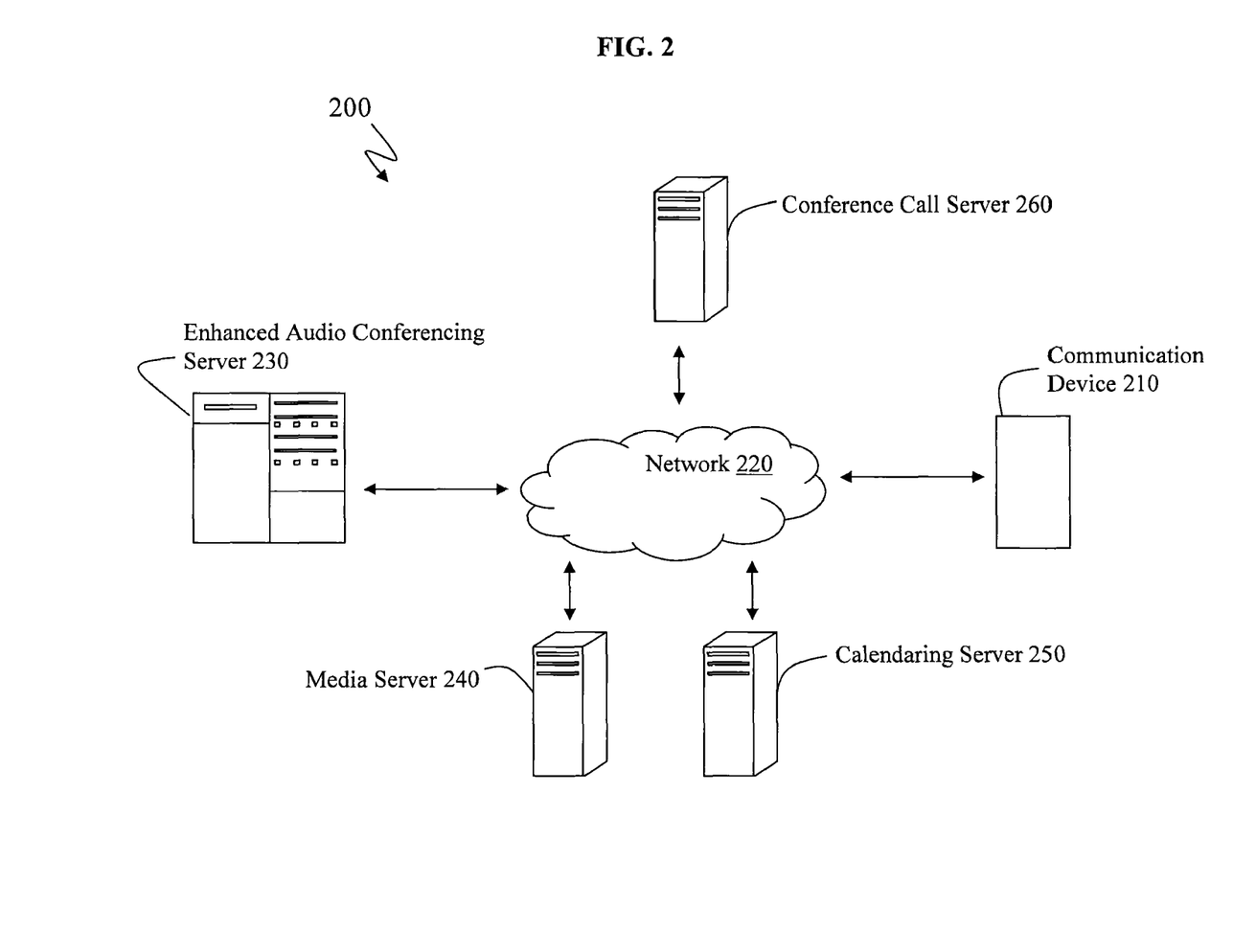
FIG. 2 illustrates a system in which exemplary embodiments may be implemented.

FIG. 2 illustrates a system 200 in which exemplary embodiments may be implemented. The system 200 may include one or more communication devices 210. The communication device 200 is operatively connected to a network 220.

The communication device 210 may operatively connect to an enhanced audio conferencing server 230 via the network 220. The enhanced audio conferencing server 230 may operatively connect to a media server 240, a calendaring server 250, and a conference call server 260. Also, in accordance with exemplary embodiments, the enhanced audio conferencing server 230 may include some or all of the functionality of the media server 240, the calendaring server 250, and/or the conference call server 260.

In accordance with exemplary embodiments, the enhanced audio conferencing server 230 is configured to provide queuing, controlling, and playing of audible media in a telephony environment. In exemplary embodiments, the enhanced audio conferencing server 230 is aware of the user of the communication device 200 dialing in (e.g., the user may dial a specific telephone number that corresponds to the enhanced audio conferencing server 230), and the enhanced audio conferencing server 230 provides numerous opportunities for the user to consume audible media.

Additionally, the network 220 may include circuit-switched and/or packet-switched technologies and devices, such as routers, switches, hubs, gateways, etc., for facilitating communications. The network 220 may include wireline and/or wireless components utilizing, e.g., IEEE 802.11 standards for providing over-the-air transmissions of communications. The network 220 can include IP-based networks for communication between a customer service center and clients/users. The network 220 can be representative of countless networks.

In exemplary embodiments, the network 220 can be a managed IP network administered by a service provider, which can control bandwidth and quality of service for the communications discussed herein. The network 220 may be implemented in a wireless fashion, e.g., using wireless protocols and technologies, such as WiFi, WiMax, BLUETOOTH, etc. The network 220 can also be a packet-switched network as a local area network, a wide area network, a metropolitan area network, an Internet network, or other similar types of networks. The network 220 may be a cellular communications network, a fixed wireless network, a wireless local area network (LAN), a wireless wide area network (WAN), a personal area network (PAN), a virtual private network (VPN), an intranet or any other suitable network, and the network 220 may include equipment for receiving and transmitting signals, such as a cell tower, a mobile switching center, a base station, and a wireless access point.

Furthermore, exemplary embodiments are not limited to but are capable of being implemented in the system 200 illustrated in FIG. 2. Additionally, the servers 230, 240, 250, and 260 in FIG. 2 may be representative of numerous servers. Therefore, the system 200 illustrated in FIG. 2 is neither limited numerically to the elements depicted therein nor limited to the exact configuration and operative connections of elements. Further, it is understood by those skilled in the art that elements may be added to, subtracted from, or substituted for the elements described in FIG. 2.

Figure 3:
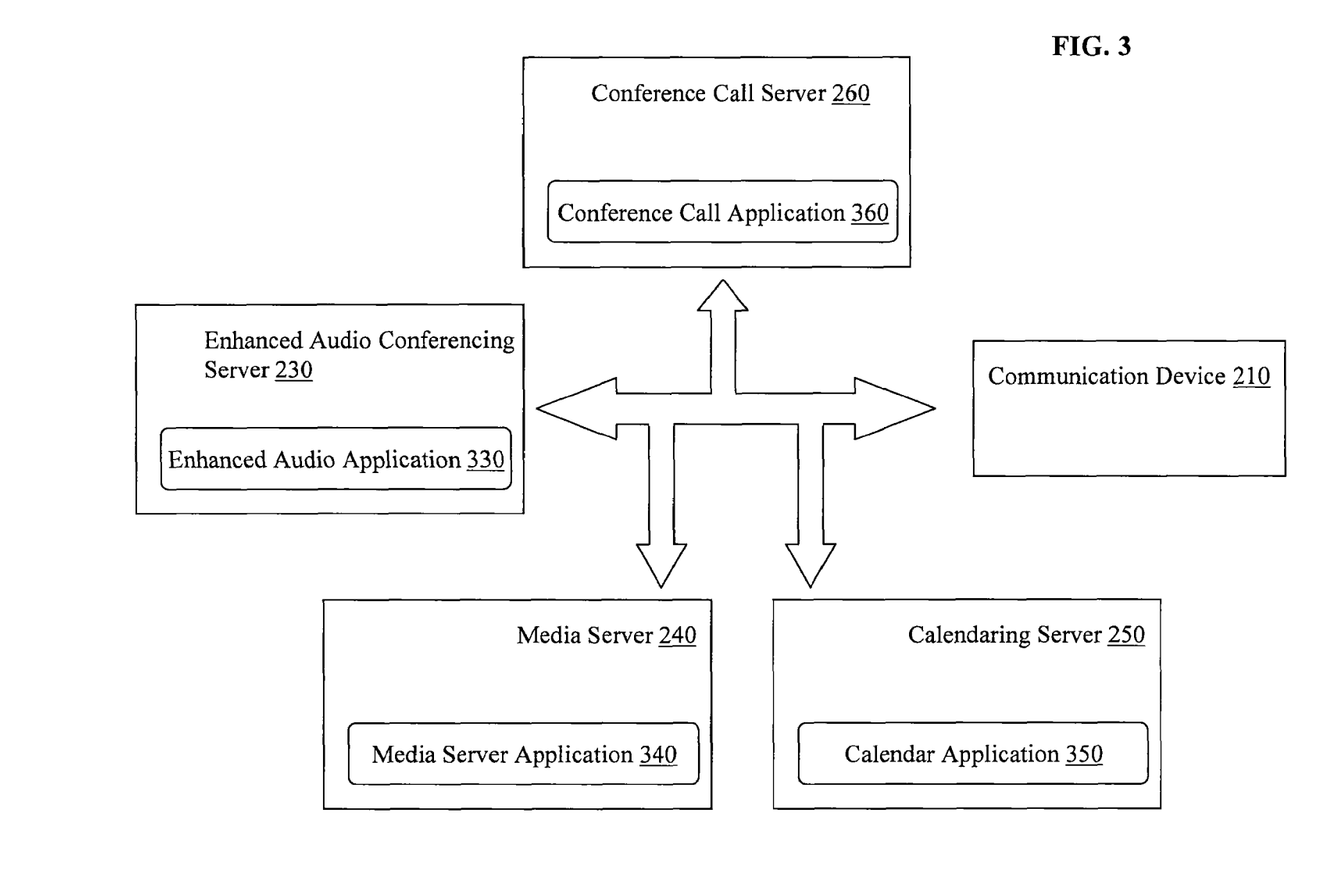
FIG. 3 illustrates block diagram depicting interactions among entities in a system in accordance with exemplary embodiments.

FIG. 3 illustrates a block diagram depicting interactions among entities in the system 200 in accordance with exemplary embodiments.

In accordance with exemplary embodiments, a user utilizing the communication device 200 may call into an enhanced audio application 330 of the enhanced audio conferencing server 230. The user may log onto the enhanced audio application 330 of the enhanced audio conferencing server 230 with his or her credentials (e.g., with a username, such as the user's telephone number, and with a password). After the user has been authenticated, the enhanced audio application 330 may operatively connect to a media server application 340 of the media server 240 and/or the calendar application 350 of the calendaring server 250. The enhanced audio application 330 may access the various media (such as podcasts or any audio content) on the media server 240 that relates to the user who logged into the enhanced audio conferencing server 130.

Also, the enhanced audio application 330 may access the calendaring application 350 that corresponds to the user. The enhanced audio application 330 in cooperation with the calendaring application 350 analyzes the user's calendar to determine scheduled conference calls and to extract the call in telephone numbers for the scheduled conference calls.

The enhanced audio application 330 can present the user with a list of conference calls that are on his or her calendar. The enhanced audio application 330 can incorporate various audible content at various points in time to coordinate with the user's scheduled conference calls. The enhanced audio application 330 can place a telephone call (e.g., can dial in) to a conference call application 360 of the conference call server 260 so that the user can participate in the scheduled conference call.

In accordance with exemplary embodiments, there are many options in which the audio content may be played to coordinate with the user's scheduled conference calls.

As an example, while the user is on hold, the enhanced audio application 330 may have the user choose to override the silence (or music) that is played on hold with audible media of the user's choice.

As another example, during an inter-call (which is the dead time between scheduled conference calls), the enhanced audio application 330 can play the audible media to the user until the next scheduled conference call starts.

As an example, during intra-call, the enhanced audio application 330 can play audible media instead of the scheduled conference call, allowing the user to drop in and out of the scheduled conference call with the keypad.

As another intra-call example, the enhanced audio application 330 can play the audible media over the scheduled conference call. For example, the enhanced audio application 330 may play the audible media louder (or softer) than the scheduled conference call, allowing the user to toggle (like picture in picture for voice) between having the audio media louder or having the scheduled conference call louder.

As a further intra-call example, the enhanced audio application 330 may play the audio media in one of two available headphones (e.g., on a voice over Internet protocol call) and play the scheduled conference call in the other available headphone. For example, the user may be wearing a binaural headset, and the enhanced audio application 330 can play the audio media in one ear and the scheduled conference call in the other ear, while the user has options to moderate volume.

Additionally, during a scheduled conference call, the user may have the enhanced audio application 330 automatically switch back to the scheduled conference call when any pre-configured trigger occurs. A trigger, e.g., may be a name, keyword, time elapse, or data landmark (e.g., page in PowerPoint slide show). Moreover, the user can set triggers for the enhanced audio application 330, so that when a trigger occurs, the enhanced audio application 330 will switch (from the audio media) back to the scheduled conference call.

There are many ways in which the audio media can be configured with the enhanced audio application 330. The audible media which gets played can be configured via a web user interface (UI), voice response unit (VRU), and/or phone keypad entry. Also, the enhanced audio application 330 can automatically determine (and suggest) the audio media to play based on which of the available podcasts would be relevant to the upcoming (or previous) conference call.

The enhanced audio application 330 can connect to the media server application 340 to access and/or obtain various audible media for the user. The audible media may include, e.g., a podcast, audio file, audio track from a video, and/or variants on the theme of recorded audio media. The audible media may also include voice mail messages, and textual content that has been synthesized into voice. In addition to directing the playing audio media to a single user, the enhanced audio application 330 can play the media into the active conference call to share the audible media with other members of the scheduled conference call.

While listening to the audio media, the enhanced audio application 330 allows the user to perform (e.g., from the communication device 200) an assortment of functions, including (but not limited to): rewind, replay, fast forward, volume control for the audio media, volume control for the conference call, and/or selection of other audio media titles. Also, the enhanced audio application 330 allows the user to mark a reference point to begin playing or to come back to. When audio media is started and stopped, the enhanced audio application 330 can resume the audio media from the last point the audio media stopped. The enhanced audio application 330 allows the user to record telephone calls in a stored digital format, which would also be available for playback.

Figure 4A:
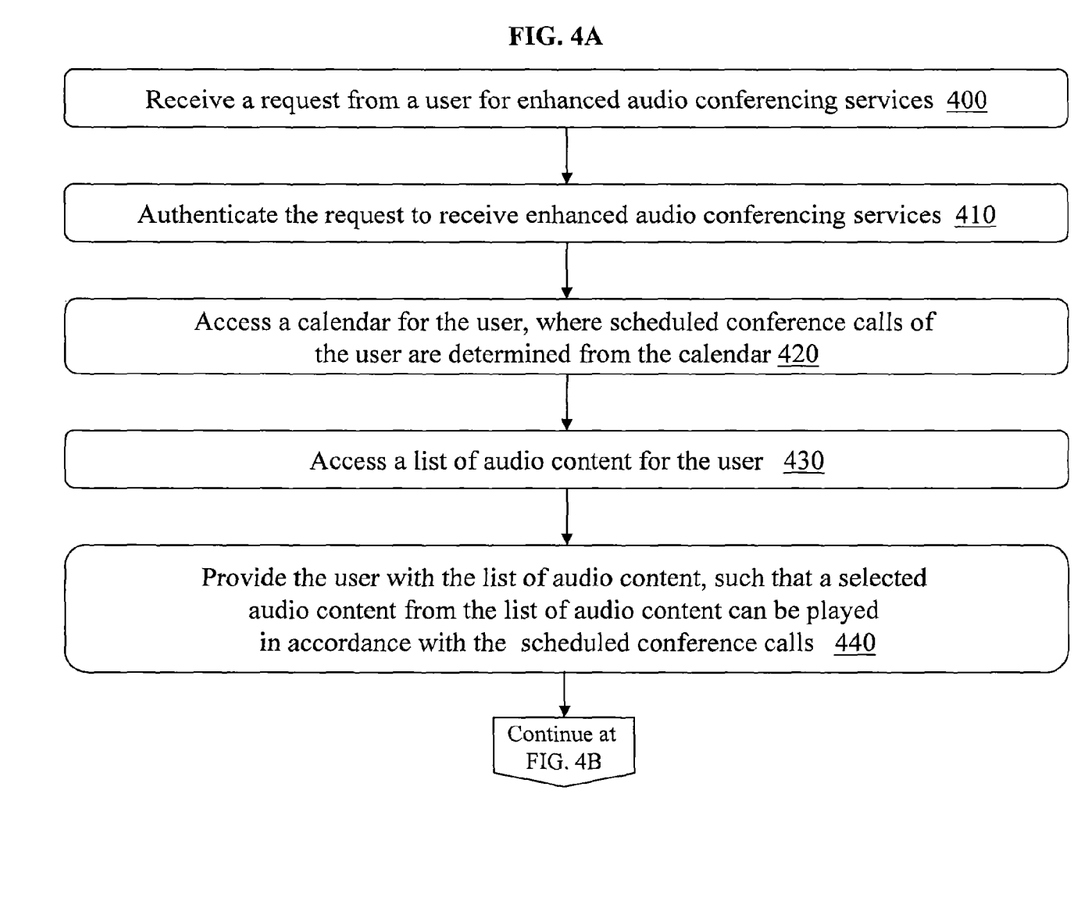
FIGS. 4A and 4B illustrate a method for enhanced audio conferencing services in accordance with exemplary embodiments.
Figure 4B:
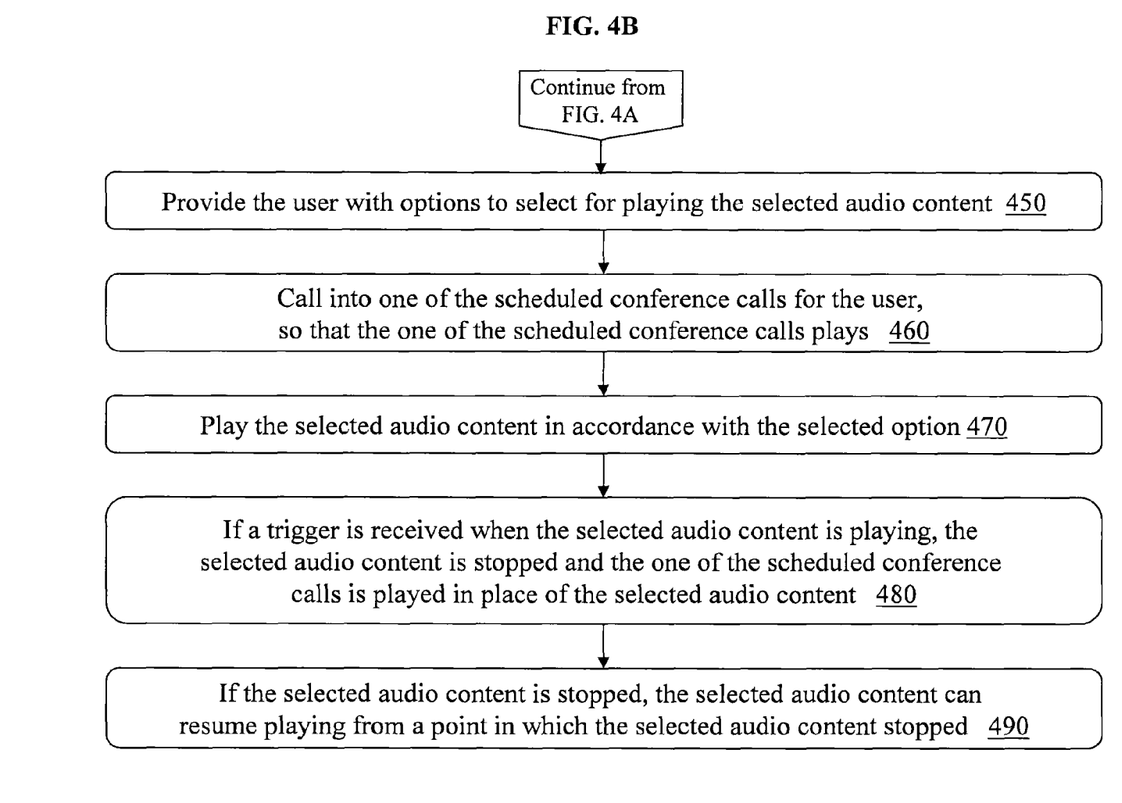

FIGS. 4A and 4B illustrate a method for enhanced audio conferencing services in accordance with exemplary embodiments.

In exemplary embodiments, the enhanced audio application 330 of the enhanced audio conference server 230 receives a request from a user for enhanced audio conferencing services at 400. The user may utilize the communication device 210 to call the enhanced audio conferencing server 230. The enhanced audio application 330 may automatically recognize the user's telephone and prompt the user to input the user's password.

The enhanced audio application 330 authenticates the user's request to receive enhanced audio conferencing services at 410.

In response to proper authentication of the user, the enhanced audio application 330 may access a calendar for the user, where scheduled conference calls of the user are determined from the calendar at 420. For example, the enhanced audio application 330 may operatively connect to the calendar application 350, and the calendar application 350 and/or the enhanced audio application 330 may determine the scheduled conference calls (e.g., for the day, week, or month).

The enhanced audio application 330 may access a list of audio content for the user at 430. The enhanced audio application 330 may operatively connect to the media server application 340 to access audio media for the user. Also, the enhanced audio application 330 may store audio media for the user in the memory of the enhanced audio conferencing server 230.

The enhanced audio application 330 may provide the user with the list of audio content, such that a selected audio content from the list of audio content can be played in accordance with the scheduled conference calls at 440. For example, the user may utilize the communication device 210 to select a podcast to be played in accordance with the scheduled conference calls. Also, the user may access the enhanced audio conferencing server 230 via the Internet (e.g., via the network 220), and the user can select a podcast to be played to coordinate with the scheduled conference calls.

The enhanced audio application 330 may provide the user with options to select for configuring how the selected audio content should be played at 450. The user may choose any single option and/or combinations of option. The options for playing the selected audio content may include: playing the selected audio content in between scheduled conference calls, playing the selected audio content louder than the scheduled conference calls, playing the selected audio content softer than the scheduled conference calls, and/or playing the selected audio content in one audio speaker while the scheduled conference calls play in another audio speaker.

The enhanced audio application 330 may call into one of the scheduled conference calls for the user, so that the scheduled conference calls can play at 460. For example, the enhanced audio application 330 may dial into the conference call server 260 so that the user can participate in the scheduled conference call.

In accordance with the selected option for how the selected audio content should be played, the enhanced audio application 330 plays the selected audio content to coordinate with the one of the scheduled conference calls at 470.

If the enhanced audio application 330 receives a trigger when the selected audio content is playing, the selected audio content is stopped and the one of the scheduled conference calls is played in place of the selected audio content at 480.

If the selected audio content is stopped, the enhanced audio application 330 can resume the selected audio content to play from a point in which the selected audio content stopped at 490.

Further, as an example, the enhanced audio application 330 may indicate that the user has a first scheduled conference call at 2:00-300, a second conference at 3:15-4:00, and third conference call at 4:00-5:00. The enhanced audio application 330 may indicate that the user has audio content A, audio content B, and audio content C.

The user may elect to have audio content A play for the first 15 minutes of the first conference call at 2:00-3:00 and have audio content A resume at 3:00 when the first conference call ends. The audio content A may continue until the second conference call 3:15-4:00. The enhanced audio application 330 may prompt the user that the next conference call is starting is starting in 5 minutes.

The user may elect to have audio content B play softly during the second conference call 3:15-4:00, so that the user can increase or decrease the volume of the audio content B as desired.

The user may be only less important person in the third conference call at 4:00-5:00, and the user is participating just in case he is needed. The user may elect to play the audio content C in place of the third conference call at 4:00-5:00, and the user may set a trigger. The trigger may be the user's name or certain subject that corresponds to the user. The trigger will cause the enhanced audio application 330 to stop the audio content C and play the third conference call.

It is understood that various examples have been provided to illustrate the enhanced audio conferencing services, and the exampled illustrated herein are not meant to be limiting. The enhanced audio services can operate with a regular ("dumb") telephone that has no advanced internal processing or memory capabilities. As well, the enhanced audio services can operate with a mobile device that has advanced processing and memory capabilities.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for enhanced audio conferencing services, comprising:
   receiving, by an audio conferencing server, a request from a user for enhanced audio conferencing services;
   authenticating the request to receive enhanced audio conferencing services;
   receiving, by the audio conferencing server, scheduled conference calls of the user from a calendar server to determine the scheduled conference calls for a day, the scheduled conference calls are different from one another;
   wherein the audio conferencing server extracts telephone numbers corresponding to the scheduled conference calls for the day, in order for the audio conferencing server to respectively place telephone calls to the telephone numbers of the scheduled conference calls;
   accessing a list of audio content for the user;
   providing the user with the list of audio content, such that a selected audio content from the list of audio content can be played in accordance with the scheduled conference calls, the selected audio content includes voice mail messages of the user;
   providing the user with options to select for playing the selected audio content, wherein the options for playing the selected audio content comprises:
      playing the selected audio content in between the scheduled conference calls that are different from one another; and
      playing the selected audio content in one audio speaker while the scheduled conference calls play in another audio speaker;
   calling, by the audio conferencing server, into one of the scheduled conference calls for the user via the telephone numbers, so that the one of the scheduled conference calls plays; and
   playing the selected audio content in accordance with the selected option;
   wherein if a trigger is received when the selected audio content is playing, the selected audio content is stopped and the one of the scheduled conference calls is played in place of the selected audio content, the trigger to stop playing the selected audio is configured to include a name of the user, a particular subject matter corresponding to the user, and a page in a slide show presentation; and
   wherein if the selected audio content is stopped, the selected audio content can resume playing from a point in which the selected audio content stopped.

* * * * *